Aug. 28, 1956  E. A. BOVEE  2,760,327
HOUSING FOR DISC TYPE POWER MOWER
Filed Dec. 1, 1954  6 Sheets-Sheet 1

INVENTOR.
ELIAD A. BOVEE
BY
Barnes, Kisselle, Laughlin & Raisch
ATTORNEYS.

Aug. 28, 1956 E. A. BOVEE 2,760,327
HOUSING FOR DISC TYPE POWER MOWER
Filed Dec. 1, 1954 6 Sheets-Sheet 2

INVENTOR.
ELIAD A. BOVEE
BY
ATTORNEYS.

Aug. 28, 1956   E. A. BOVEE   2,760,327
HOUSING FOR DISC TYPE POWER MOWER
Filed Dec. 1, 1954   6 Sheets-Sheet 3
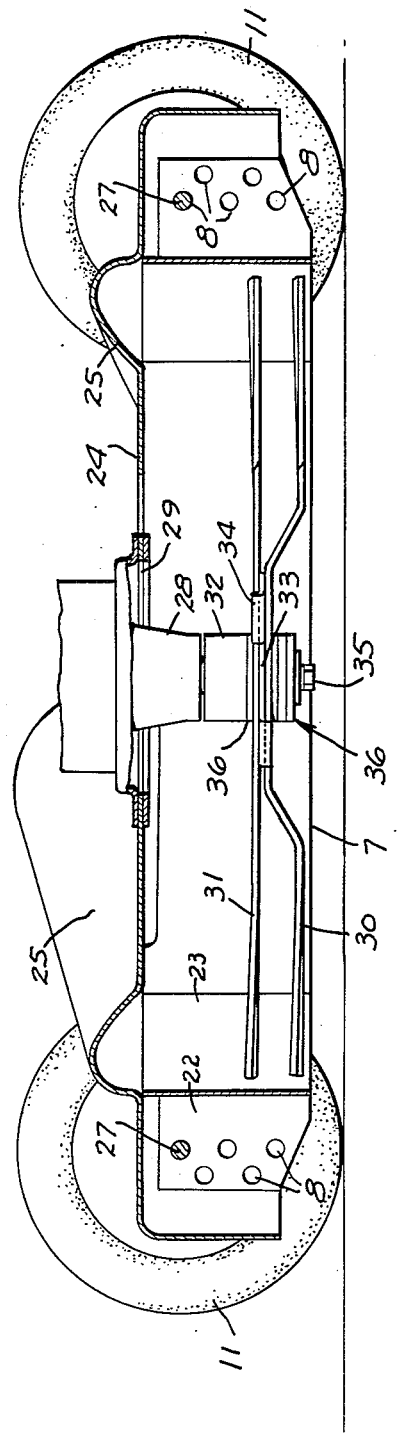
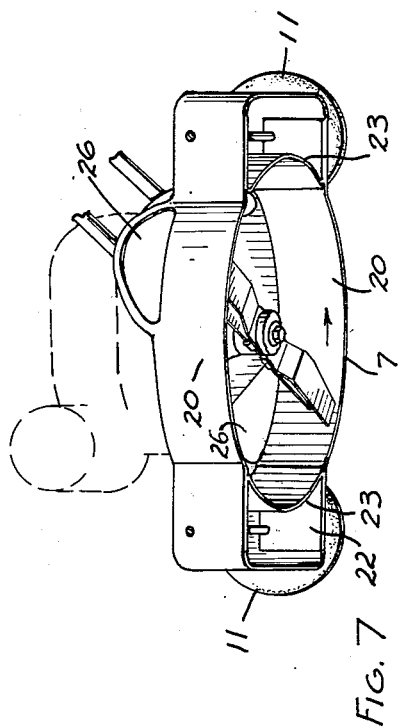
INVENTOR.
ELIAD A. BOVEE
BY
Barnes, Kisselle, Laughlin & Raisch
ATTORNEYS.

Aug. 28, 1956 E. A. BOVEE 2,760,327
HOUSING FOR DISC TYPE POWER MOWER
Filed Dec. 1, 1954 6 Sheets-Sheet 4

INVENTOR.
ELIAD A. BOVEE
BY
Barnes, Kisselle, Laughlin & Raisch
ATTORNEYS.

Aug. 28, 1956  E. A. BOVEE  2,760,327
HOUSING FOR DISC TYPE POWER MOWER
Filed Dec. 1, 1954  6 Sheets-Sheet 5
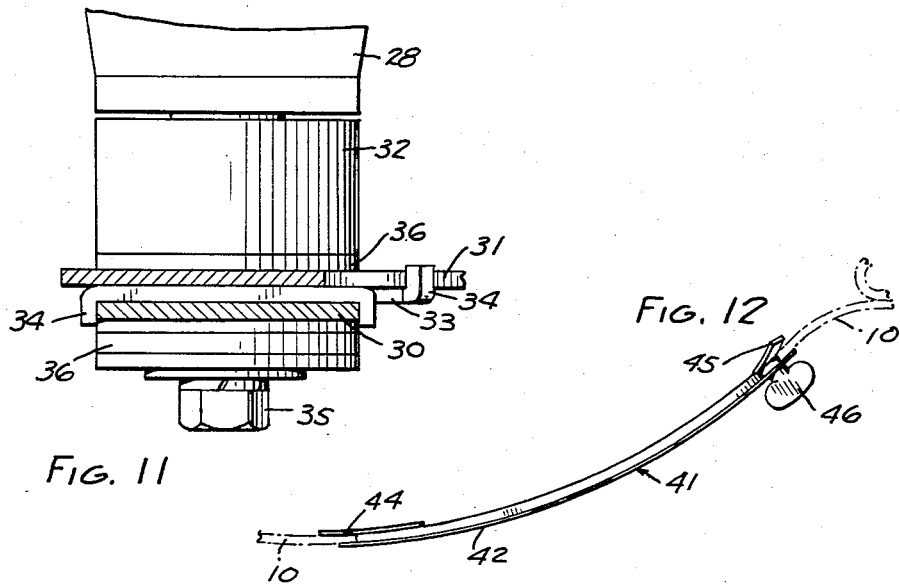
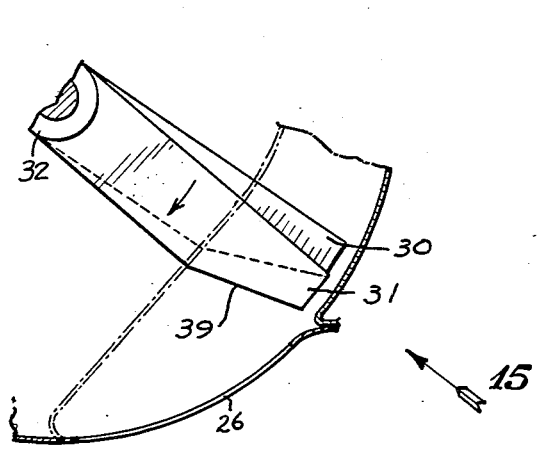
INVENTOR.
ELIAD A. BOVEE
BY
ATTORNEYS.

Aug. 28, 1956  E. A. BOVEE  2,760,327
HOUSING FOR DISC TYPE POWER MOWER
Filed Dec. 1, 1954  6 Sheets-Sheet 6

INVENTOR.
ELIAD A. BOVEE
BY
ATTORNEYS.

United States Patent Office 2,760,327
Patented Aug. 28, 1956

2,760,327
HOUSING FOR DISC TYPE POWER MOWER

Eliad A. Bovee, Lansing, Mich., assignor to Motor Wheel Corporation, Lansing, Mich., a corporation of Michigan Application December 1, 1954, Serial No. 472,327

15 Claims. (Cl. 56—25.4)

This invention relates to a mower and more particularly to a power lawn mower of the rotary type for cutting grass and other vegetation.

Rotary mowers of the type having a rotating blade arranged to rotate about a substantially vertical axis and in a substantially horizontal cutting plane combined with a housing which overlies the blades are generally old. In this type of mower the blade cuts the grass at the forward end of the mower as it advances into the grass to be cut. Grass is used herein to designate vegetation generally of the nature cut by lawn and field mowers. In such a mower, which is usually powered by a gasoline engine or an electric motor carried by the housing which overlies the blade, the blade usually rotates at the R. P. M. of the engine crankshaft. A satisfactory cutting speed is in the neighborhood, for example, of 3400 to 4000 R. P. M. At this speed the angular peripheral speed of the outer edge of the blade is very high. As the blade attacks the grass along the front of the advancing mower and cuts the same, the blade cuts the grass and throws it tangentially.

As the rotary lawn mower of the prior art cuts the grass over a swath, for example, of twenty inches, it will pile up the cut grass in a windrow along one side of the swath and along the line of travel of the mower, the windrow having a width of about three to six inches. This windrow, particularly where the grass being cut is long, say, e. g., three to six inches, and dense, will smother the grass beneath it and either brown or kill the grass unless the windrow is raked and picked up or scattered.

In an attempt to overcome this defect some rotary mowers have been provided with a discharge outlet, see, for example, the patent to Frey 1,899,564. This type of outlet, as shown in Frey, has two deficiencies; namely, the outlet is positioned centrally of the rear end of the mower housing and the outlet extends all the way to the bottom of the housing or to the ground and well into the plane of the rotating blade. Such an outlet will not prevent windrowing of the cut grass, and has a further disadvantage; namely, if the rotary blade which is traveling at high speed picks up a stone or other object, it will hurl it through the outlet. Such flying object might very well cause serious damage to anything or person it might hit.

It is the object of the present invention to produce a lawn mower of the rotary type which will effectively cut and scatter over a wide area the grass cuttings and also cut the grass into smaller pieces than other presently available rotary lawn mowers operating under the same conditions.

The invention also contemplates a rotary lawn mower wherein any object that might be struck by the blades will be trapped in the housing and the blade will not be able to project the object from the housing except somewhere along the lower edge where the housing is close to the ground. In such case the speed of the object, if it escapes from the housing at all, is considerably slackened and almost brought to a stop, or at least reduced to such slow speed by contact with the lower edge of the housing and the ground that a stone or other object will roll harmlessly but a few feet from the housing.

In accomplishing these objects the invention contemplates a rotary mower wherein the blade is housed in a housing comprising a vertical, substantially imperforate cylindrical wall having its axis substantially concentric with the axis of rotation of the blade and extending to or below, and also a substantial distance above, the plane of rotation of the blade, for example, three to six inches, and wherein the top of the housing above the substantially imperforate cylindrical wall is provided with an arcuate open-bottomed duct communicating with the interior of the housing, extending upwardly from the top of the housing and along the edge of the cylindrical wall where it terminates in an outlet opening positioned wholly forward of the transverse center line of the housing and in the side of the housing towards which the cutting edge of the blade rotates or travels while cutting the grass into which the mower is advancing.

In the conventional lawn mower of the rotary type, when used to mulch leaves or grass, the mower is provided with a foraminated or perforated ring having a multiplicity of almost contiguous or closely positioned holes in the neighborhood of three-quarters to an inch in diameter. Such ring is known as a mulching ring and is mounted around the path of travel of the blade in a rotary mower. Mulching rings have two defects; namely, with such a mulching ring in place a rotary mower cannot be used satisfactorily to cut grass because the grass cuttings will stick to the perforated mulching ring like plaster to wire lath, jam up or ball in the housing and stop the rotation of the blade and stall the engine. This same undersirable result will occur when the mulching ring is used for mulching wet leaves. This requires the operator, very frequently particularly when mowing fairly deep grass or wet leaves, to tilt the mower on its side and remove the jammed up or balled leaves or grass. In addition, considerable time and effort must be expended in the mounting and removal of the mulching ring.

It is an object of this invention to produce a mower which can be used both for cutting grass and for mulching grass and leaves, either wet or dry, without the need for a mulching ring or in anywise modifying or implementing either the cutting blade or the cylindrical housing.

Since this invention also contemplates a mower which will cut equally well when driven in either direction, that is, either forwardly or rearwardly, the housing is preferably provided with two arcuate or helical open-bottomed ducts positioned 180° apart. The second duct and discharge outlet will be positioned along the side of the housing forwardly in the direction of travel of the cutting edge of the blade when the mower is drawn rearwardly into the grass or other growth which is to be cut. Here again, the second duct and outlet will be positioned wholly forwardly of the transverse center line of the cylindrical housing, forwardly, i. e., in the sense of the direction that the power mower is traveling.

The invention also contemplates a rotary type lawn mower which is safe to operate for the reasons delineated below.

In the drawings:

Fig. 4 is an enlarged section along the line 4—4 on Fig. 3.

Fig. 7 is a reduced perspective view taken from below the lawn mower.

Fig. 11 is an enlarged fragmentary sectional view along the line 11—11 on Fig. 5.

Fig. 12 is an enlarged top elevational view of a cover adapted for attachment over a discharge opening of the lawn mower.

Fig. 13 is an enlarged side elevation of the cover.

Fig. 14 is a fragmentary sectional view of the blade and mower housing in the area of the discharge outlet.

Figure 1:
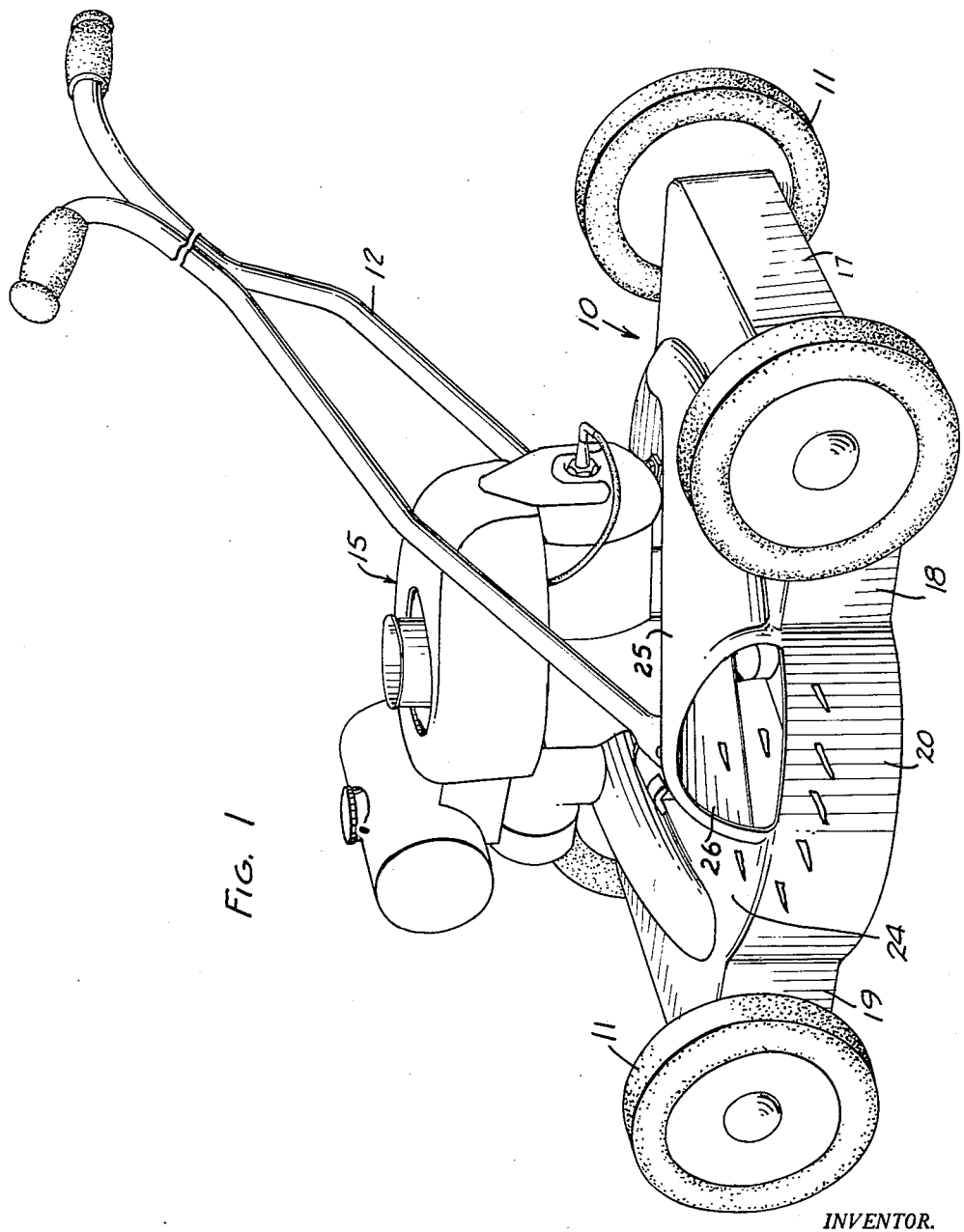
Fig. 1 is a perspective view of the power lawn mower.
Figure 2:
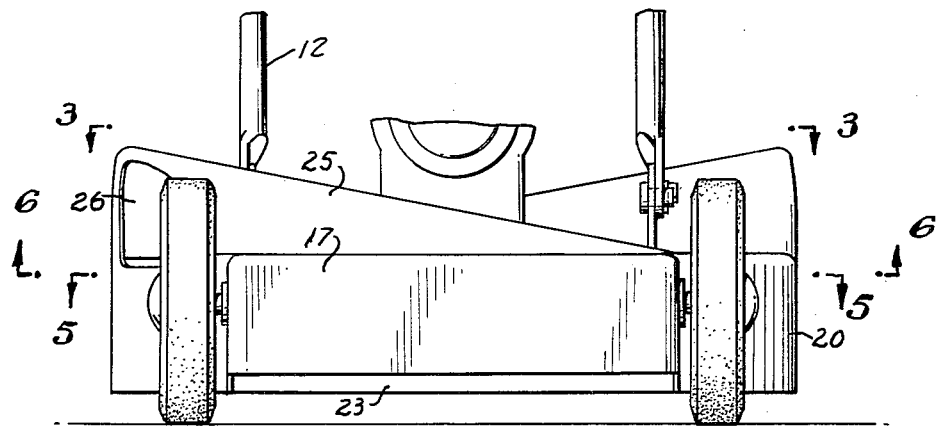
Fig. 2 is a front or rear elevational view, the handle being broken away.

Referring to the drawings, the power lawn mower comprises a housing 10 provided with wheels 11 for rolling along the ground and adapted to be pushed by means of a handle 12 pivotally attached to brackets 13, 14 fixed on the top of the housing. The power unit may be either an electric motor or a gas engine. As herein shown the power unit 15 is a gasoline engine.

Figure 5:
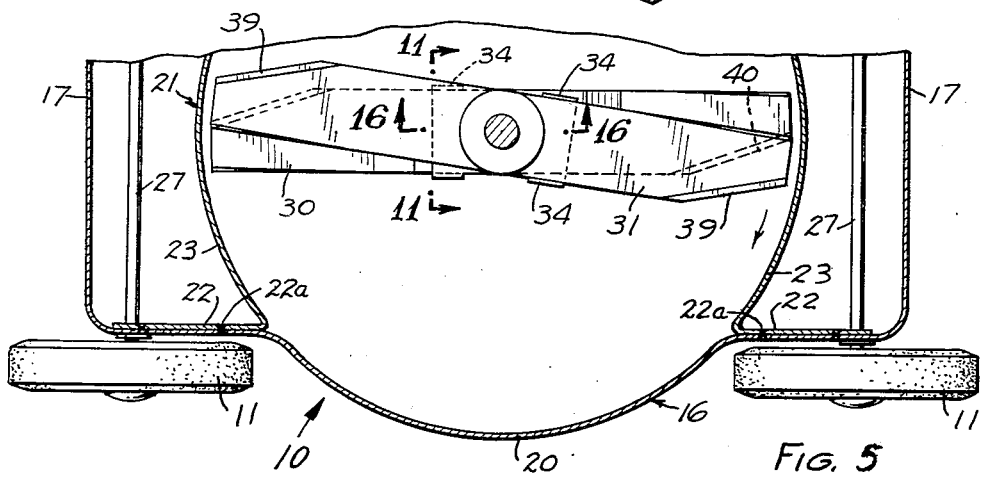
Fig. 5 is a fragmentary section along the line 5—5 on Fig. 2.
Figures 8, 9, 10:
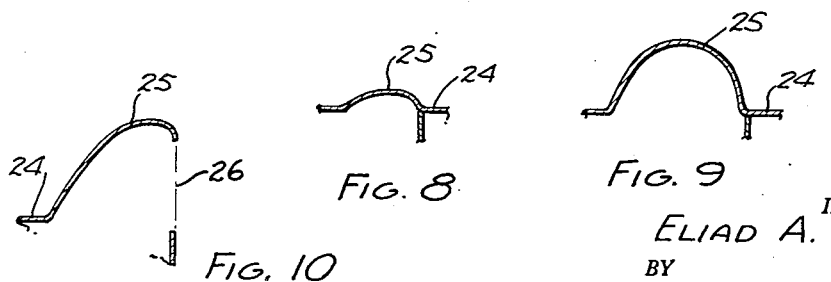
Fig. 8 is a fragmentary sectional view along the line 8—8 on Fig. 3.
Fig. 9 is a fragmentary sectional view along the line 9—9 on Fig. 3.
Fig. 10 is a fragmentary sectional view along the line 10—10 on Fig. 3.

As shown in Fig. 5, the housing 10 includes longitudinal side walls 16 and transverse end walls 17. Each side wall 16 comprises straight or planar end portions 18, 19 separated by an intermediate arcuate portion 20. Inserts 21 are fixed within the housing 10 and comprise short vertical planar walls 2 juxtaposed and spot welded as at 22a to the end portions 18, 19 and separated by arcuate sections 23. The arcuate sections 23 of the inserts 21 cooperate with the arcuate portions 20 of the longitudinal side walls 16 to form a substantially imperforate vertical cylindrical wall.

Figure 3:
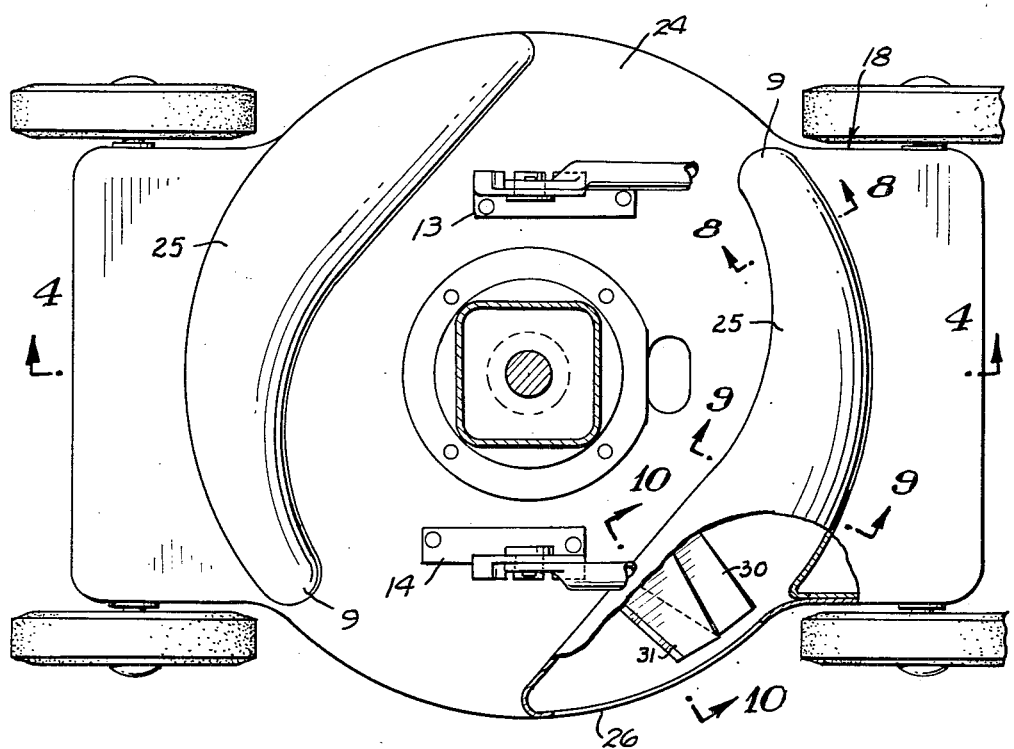
Fig. 3 is a sectional plan view of the lawn mower along the line 3—3 on Fig. 2.
Figure 6:
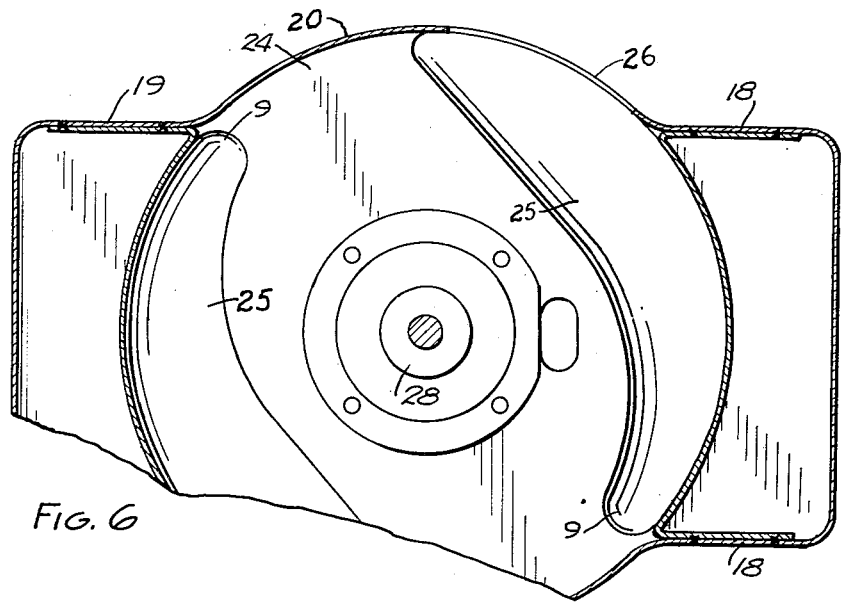
Fig. 6 is a fragmentary section along the line 6—6 on Fig. 2.

As shown in Figs. 1, 3 and 4, the top 24 of the housing is substantially horizontal. The top 24 has arcuate open-bottomed ducts 25 formed therein and extending upwardly from the top surface thereof above and adjacent the inner periphery of the cylindrical wall 20, 23. The ducts 25 are generally arcuate in cross-sectional configuration and of gradually increasing height and radius, thus tapering upwardly from one end 9 toward discharge outlets 26 (Figs. 6, 8, 9, 10). The ducts 25 terminate in diametrically opposed discharge openings or outlets 26 at each side of the housing above the level of the arcuate portions 20 which form a part of the cylindrical wall. As shown in Fig. 3, each duct 25 extends from a point 9 at one side of the housing adjacent a longitudinal end wall 18 in the same direction as the rotation of the cutting blade (clockwise) to a point adjacent the transverse center line of the housing where it terminates at outlet 26. Thus, duct 9 is positioned wholly forwardly (in direction of mower travel) of the transverse center line of housing 20, 23. The arcuate extent of the duct is preferably approximately 135°. The preferred cross-sectional configuration of the open-bottomed ducts has been shown and described, but the configuration may also be square, rectangular or other shape.

The longitudinal end side wall portions 18, 19 and contiguous walls 22 are provided with vertically spaced openings 8 adapted to receive the axles 27 upon which wheels 11 are mounted. By selectively positioning the axle in a particular pair of aligned openings, the relative position of the housing with respect to the ground may be adjusted thereby adjusting the height to which the grass is to be cut.

It can thus be seen that there is provided by this construction a housing the halves of which are identical about any diametral vertical plane.

The power unit includes a spindle 28 (Fig. 4) extending downwardly through an opening 29 at the center of the top 24 of the housing. The spindle, which is a continuation of the engine crankshaft, is rotated by the engine in the conventional manner.

Figure 16:
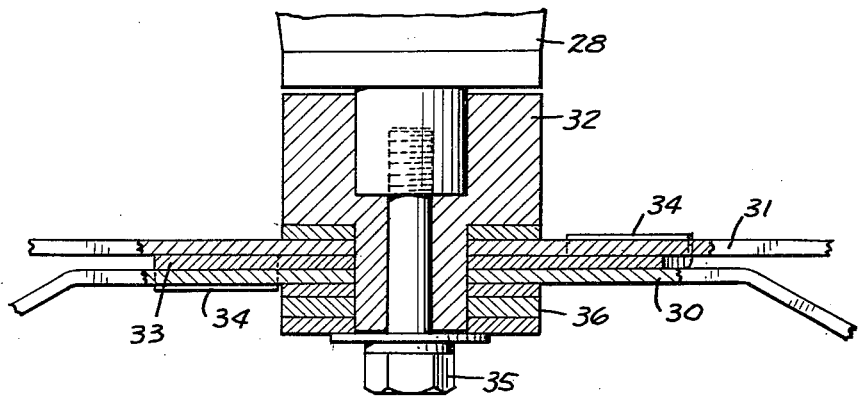
Fig. 16 is a fragmentary section along the line 16—16 on Fig. 5, showing the mounting of the cutting blade, on an enlarged scale.

A cutter blade 30 and preferably a guard blade 31 are mounted for rotation with the spindle 28. Referring to Figs. 11 and 16, the conical end of the engine spindle 28 has pressed thereon a Y-section spacer 32 which serves as a pilot for the blades 30 and 31, a yoke 33 with U-shaped ends 34 wrapped around the guard blade 31 at the right, Fig. 4, and the cutter blade 30 at the left, Fig. 4. The blades are retained on the spindle by a bolt 35 screwed into a threaded opening in the lower end of spindle 28 and suitable washers 36. As shown in Figs. 4 and 5, the yoke 33 serves to vertically space the guard blade 31 and cutting blade 30 and, in addition, the U-shaped ends 34 engage the guard and cutting blades 31 and 30, respectively, to provide the desired angular displacement between the blades.

The cutting blade 30 has its ends bent downwardly and sharpened to form cutting edges 39 parallel and vertically spaced from the guard blade 31. The guard blade 31 may also have cutting edges 40.

As shown in Fig. 4, the cylindrical wall of the housing extends downwardly with its lower edge 7 below the plane of the cutting blade. The diameter of the circular wall is slightly greater than the length of the cutting blade 30. The ends of the blades are preferably inclined so that the blade acts as an impeller. The ends of the guard blade 31 can be similarly inclined for the same purpose.

As shown in Figs. 12 and 13, a cover 41 may be provided for covering either one or both of the discharge openings 26. The cover includes a central arcuate portion 42 having the general configuration of the discharge opening which is to be closed and a peripheral flange 43. A retaining clip 44 is welded to one end of the cover and a latch 45 is rotatably mounted in the other end of the cover and adapted to be rotated by a handle 46. Clip 44 and latch 45 interengage the housing 10 at opposite ends of the outlet openings and provide for easy mounting of the covers on, and dismounting from, the discharge outlets.

In the embodiment described, the housing 10 and cover have been shown and described, by way of example, as made from sheet metal stampings, but they could be made as castings.

The operation of the lawn mower is as follows:

Referring to Fig. 4, the circular wall of the housing which surrounds the cutting blade projects downwardly below the plane of the cutting blade. As a result when the cutting blade is rotated at high speed, a negative pressure is created below the blade causing the grass to be pulled upwardly by suction into position where the rotation of the blades cuts the ends of the grass. The blade 30 creates a positive pressure above its plane of rotation. The grass cuttings are subjected to the differential pressure existing in the housing and the centrifugal action caused by the rotating cutting blade and are tumbled and cut time and time again until they are forced out of the discharge openings 26 above the level of the circular wall of the housing, as shown in Fig. 1. Since two discharge openings are provided in diametrically opposed relationship, the cuttings need only be carried to the nearest discharge opening and are immediately discharged. The nearest discharge opening is always less than 180° away from the point of cutting. This prevents balling up of the grass cuttings.

Since the circular wall projects downwardly below the plane of the cutting blade, accidental injury to the operator or a person in proximity to the lawn mower is practically eliminated, in addition to the establishment of a more effective negative pressure below the blades.

The discharge of the grass cuttings is caused to take place equally on either side of the lawn mower. In addition, the cuttings are discharged at an angle above the horizontal resulting in a more even distribution of the cuttings without the formation of windrows of cuttings.

In the event that it is desired to cut the grass along a sidewalk or driveway, the discharge opening 26 adjacent the walk or driveway is covered by the cover 41 to prevent the discharge of the cuttings onto the sidewalk or driveway.

Because of the identical construction of the halves of the housing and the location of the discharge openings, the lawn mower may be operated in either direction with equal efficiency and facility.

Figure 15:
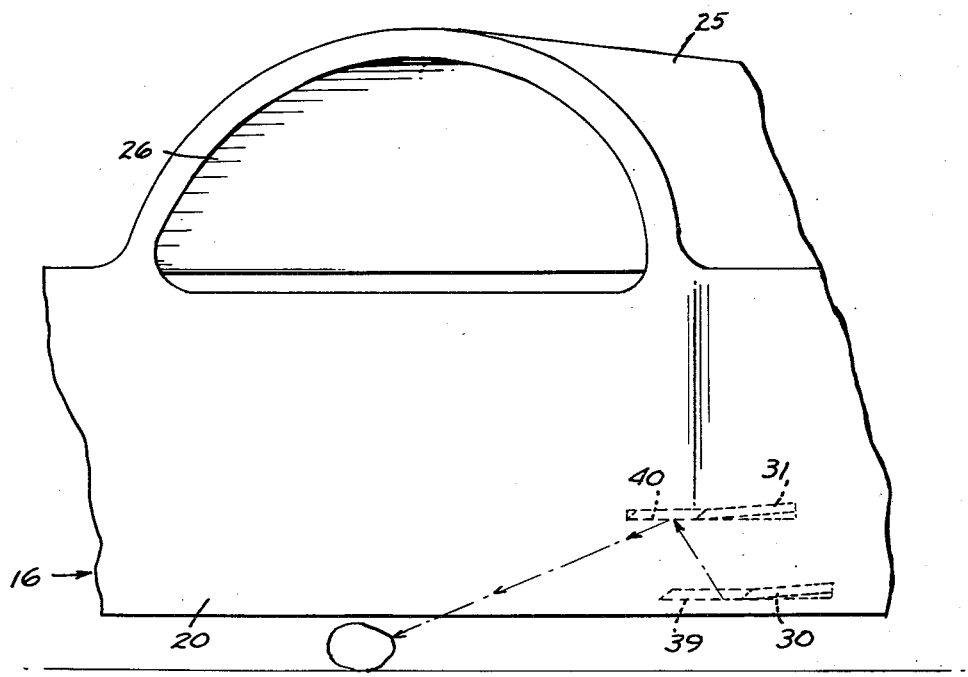
Fig. 15 is an enlarged fragmentary side elevational view as seen in the direction of the arrow 15 in Fig. 14 showing the action of the lawn mower guard blade in preventing the discharge of objects through the discharge opening.

Because of the construction wherein the cylindrical wall extends downwardly in close proximity to the ground and the discharge openings are above the level of the cylindrical wall, any objects struck by the blade will usually be thrown toward the side of the housing, striking the housing and be deflected downwardly to the ground. Infrequently where the object is elevated by the cutting blade, the guard blade 31 prevents the object from being projected directly out of the discharge openings. For example, as shown in Fig. 15, since the guard blade 31 is vertically spaced from the cutting blade 30 and angularly positioned in advance of the cutting blade, the direct line of travel between the edge of the cutting blade and any portion of the outlet is obstructed. Any objects such as stones which might be struck by the cutting blade and directly discharged to the opening are deflected downwardly by the guard blade, as shown diagrammatically by the dotted lines. The position of the guard blade with respect to the cutting blade is such that the direct discharge of objects out of the opening is prevented by either deflecting the objects downwardly or toward the walls of the housing.

The lower edge of the housing 10 extends close to the ground and is adjustable so that it can be placed as low as three-quarters of an inch from the ground. Blade 30 also preferably rotates in a plane considerably below the lower edge of outlet 26, e. g., three to six inches. The blade, which is of the impeller or screw propeller type, upon rotating creates an upward draft or suction from the outside around the lower edge of the housing into the mower and then ejects the air through the discharge outlet. This suction or vacuum action draws the grass into the housing where it is cut and as the cuttings tumble in the airstream, the severed blades of grass are cut time and again until lifted upwardly by the draft of air and ejected from the helical or arcuate duct through the outlet where the cuttings are hurled over an expanse of some three to ten feet from the mower, depending upon the speed of the blade, as shown in Fig. 1. Due to this arrangement if a stone is struck by the blade, the blade will usually throw the stone in the plane of the blade where it strikes the side of the cylindrical housing and is batted around within the housing by the blade. It is only infrequently that the blade might elevate a stone and throw it out of the outlet. However, provision is made for such a contingency by preferably baffling each blade 30 with a guard blade 31 so that the path of travel of any stone or object struck by the blade, between the point at which it is struck and the discharge outlet will be interrupted by the baffle.

In the embodiment shown for purposes of description and not by way of limitation, the circular wall of the housing is approximately eighteen inches in diameter and three and one-half inches in height, the vertical spacing between the cutting blade and the guard blade is approximately one inch and the angular displacement between the blades is approximately seven and one-half degrees.

The lawn mower may be used for mulching of leaves and the like without attachments. The leaves will be elevated within the housing by the action of suction and cut into small particles by the successive rotation of the blades. The mulched leaves will be distributed out of the discharge openings in the same manner as the grass cuttings. If still finer mulching action is desired, the outlet of the housing may be closed by the cover 41. It is believed that the efficient mulching thereby achieved is due to the leaves being drawn into the housing by the suction and continuously chopped or cut by the cutting blade until the particles are so fine that they have insufficient buoyancy to be elevated by the suction and thereafter drop to the ground. The mower described and shown herein will cut grass and mulch leaves, either wet or dry, without balling up or clogging and will cut them to the finess of the presently commercially available rotary mower which is provided with the foraminated mulching ring. If a still finer mulching action is desired, the outlet to the housing can be provided with a closure. This will cause leaves to be cut to the fineness of the order of quarter inch squares and smaller.

From the above description it will be seen that the housing for the cutting blade 30 and the guard blade 31 is provided by the arcuate side walls 20, the arcuate end walls 23, and the top wall 24. Arcuate walls 20 and 23 are shown for purposes of description only as made in separate sections. Sections 20 and 23 can be made integral to provide a one-piece cylindrical ring surrounding the cutting blade. Similarly the top portion 24 can be made integral with the circumferential walls 20 and 23.

If desired the guard blade 31 can be omitted. When the guard blade is omitted, the cutting action of the cutting blade 31 is not impaire dand the grass will be mowed and the leaves mulched as above described. The cuttings will be discharged above the level of the standing grass to avoid the formation of windrows and to spread the cuttings over a wide area.

Because of the distance that the discharge openings 25 are positioned above the rotating blade 30, the safety of operation of this mower is enhanced. Further, the possible ejection of stones or other solid debris picked up by the blade is minimized. The housing serves to completely enclose the cutting blade thereby minimizing the danger due to breaking or loosening of the blade.

The duel discharge openings allow the cuttings to be spread evenly regardless of the direction in which the mower is moving.

I claim:

1. In a rotary mower, the combination comprising a substantially vertical power shaft and a blade mounted thereon for rotation in a substantially horizontal plane, said blade having a cutting edge and means thereon for producing an air current upwardly through the plane of rotation when the blade is rotated and a housing having a substantially cylindrical imperforate wall extending into the plane of rotation of the blade and upwardly above the plane of rotation of the blade, said cylindrical wall being coaxial with the axis of rotation of the blade and extending around the path of travel of the outer end of the blade, said housing including a top wall extending over the cylindrical wall, said top and cylindrical walls forming a free and unobstructed chamber in which the blade rotates, said top wall having an arcuate opening therein extending adjacently along a portion of said cylindrical wall, means forming an inverted arcuate channel disposed over said arcuate opening and forming therewith an arcuate discharge passageway terminating adjacent the plane of said cylindrical wall in a laterally directed discharge outlet disposed above the plane of rotation of the blade and along one side of the mower housing.

2. The combination set forth in claim 1 wherein said discharge outlet has the greater portion thereof disposed above the plane of said top wall.

3. In a rotary mower, the combination comprising a substantially vertical power shaft and a blade mounted thereon for rotation in a substantially horizontal plane, said blade having a cutting edge and means thereon for producing an air current upwardly through the plane of rotation when the blade is rotated and a housing having a substantially cylindrical imperforate wall extending into the plane of rotation of the blade and upwardly above the plane of rotation of the blade, said cylindrical wall being coaxial with the axis of rotation of the blade and extending around the path of travel of the outer end of the blade, said housing including a top wall extending over the cylindrical wall, said top and cylindrical walls forming a free and unobstructed chamber in which the blade rotates, said top wall having an arcuate opening therein extending adjacently along a portion of said cylindrical wall, means forming an inverted arcuate channel disposed over said arcuate opening and forming therewith an arcuate discharge passageway terminating in a laterally directed discharge outlet, said discharge outlet being disposed substantially vertically above the path of travel of the outer end portion of the blade whereby the cuttings are ejected through said discharge outlet while still subjected to the lifting action of the air current created by rotation of the blade.

4. In a rotary mower, the combination comprising a substantially vertical power shaft and a blade mounted thereon for rotation in a substantially horizontal plane, said blade having a cutting edge and means thereon for producing an air current upwardly through the plane of rotation when the blade is rotated and a housing having a substantially cylindrical imperforate wall extending into the plane of rotation of the blade and upwardly above the plane of rotation of the blade, said cylindrical wall being coaxial with the axis of rotation of the blade and extending around the path of travel of the outer end of the blade, said housing including a top wall extending over the cylindrical wall, said top and cylindrical walls forming a free and unobstructed chamber in which the blade rotates, said top wall having diametrically opposite, arcuately-shaped openings therein extending along and adjacent a portion of said cylindrical wall, means forming a pair of inverted arcuate channels disposed over said arcuate openings in said top wall and forming therewith arcuately-shaped discharge passageways terminating in laterally directed discharge outlets, said discharge outlets being disposed substantially vertically above the path of travel of the outer end portion of the blade whereby the cuttings are ejected through said discharge outlets while still subjected to the lifting action of the air which is created by rotation of the blades.

5. The combination set forth in claim 4 wherein said discharge outlets are disposed substantially in the plane of said cylindrical wall.

6. The combination set forth in claim 4 wherein one of said discharge outlets extends substantially from and forwardly of the transverse center line of the mower housing and the other discharge outlet extends substantially from and rearwardly of the transverse center line of the mower housing diametrically opposite said first mentioned discharge outlet.

7. The combination set forth in claim 4 wherein said inverted channels taper upwardly from the plane of said top wall in the direction of said discharge outlets.

8. The combination set forth in claim 4 wherein the lower portion of said cylindrical wall extends continuously around the path of travel of the outer end of the blade and the lower edges of said discharge outlets are disposed in the plane of said cylindrical wall and above said lower portion thereof.

9. The combination set forth in claim 4 wherein each of said channels is also of arcuate shape in a plane transversely of the longitudinal axis of the channels.

10. In a rotary mower, the combination comprising a substantially vertical power shaft and a blade mounted thereon for rotation in a substantially horizontal plane, said blade having a cutting edge and means thereon for producing an air current upwardly through the plane of rotation when the blade is rotated and a housing having a substantially cylindrical imperforate wall extending into the plane of rotation of the blade and upwardly above the plane of rotation of the blade, said cylindrical wall being coaxial with the axis of rotation of the blade and extending around the path of travel of the outer end of the blade, said housing including a relatively flat top wall extending over the cylindrical wall, said top and cylindrical walls forming a free and unobstructed chamber in which the blade rotates, said top wall having diametrically opposite, arcuately-shaped openings therein, said openings each having an outer edge extending adjacent and circumferentially along a portion of the upper edge of said cylindrical wall and having an inner edge spaced radially inwardly of said outer edge, an inverted arcuate channel overlying each of said openings, each of said channels having its opposite edges coinciding with the edges of the corresponding opening and forming an arcuately shaped discharge passageway terminating at one end in a laterally directed discharge outlet, said channels being of progressively decreasing width in the direction from said discharge outlets to the other ends of said passageways, said discharge outlets being disposed above the plane of rotation of the blade along opposite sides of the mower housing and adjacent the plane of said cylindrical wall.

11. The combination set forth in claim 10 wherein said channels taper upwardly from the plane of said top wall in the direction of said discharge outlets.

12. The combination set forth in claim 11 wherein each channel is also of arcuate cross sectional shape in a plane transversely of the longitudinal axis of the channel.

13. The combination set forth in claim 1 wherein said channel is also of arcuate cross sectional shape in a plane transversely of the longitudinal axis of the channel.

14. The combination set forth in claim 1 wherein said discharge outlet extends substantially from, and forwardly of, the transverse center line of the mower housing.

15. The combination set forth in claim 1 wherein said inverted arcuate channel tapers upwardly from the plane of the top wall.

References Cited in the file of this patent
UNITED STATES PATENTS

| | | |
|---|---|---|
| 2,071,872 | Cockburn | Feb. 23, 1937 |
| 2,675,661 | Titzer | Apr. 20, 1954 |
| 2,701,942 | Caldwell et al. | Feb. 15, 1955 |
| 2,719,396 | Morris et al. | Oct. 4, 1955 |
| 2,722,281 | Falkenberg | Nov. 1, 1955 |